United States Patent [19]

Ronström

[11] Patent Number: 5,896,535

[45] Date of Patent: Apr. 20, 1999

[54] METHOD AND SYSTEM FOR TESTING COMPUTER SYSTEM SOFTWARE

[75] Inventor: Ulf Mikael Ronström, Hägersten, Sweden

[73] Assignee: Telefonaktiebolaget L M Ericsson (publ), Stockholm, Sweden

[21] Appl. No.: 08/700,177

[22] Filed: Aug. 20, 1996

[51] Int. Cl.⁶ .................................................. G06F 11/00
[52] U.S. Cl. ................... 395/701; 395/183.14; 395/704; 395/705; 702/119; 702/123
[58] Field of Search ............................. 395/701, 704, 395/705, 183.14, 183.11, 185.02, 183.21, 183.04, 183.01, 680, 183.07, 707, 685, 183.15; 364/578–580, 801, 802, 550, 551.01, 232.3, 267, 280.9, 927.81, 973, 975.4, 267.91, 945.7; 702/108, 119, 123, 182, 183, 185, 186; 707/101

[56] References Cited

U.S. PATENT DOCUMENTS

| | | | |
|---|---|---|---|
| 4,571,677 | 2/1986 | Hirayama et al. | 395/185.02 |
| 4,802,165 | 1/1989 | Ream | 395/183.14 |
| 5,121,489 | 6/1992 | Andrews | 395/183.14 |
| 5,127,103 | 6/1992 | Hill et al. | 395/183.21 |
| 5,210,876 | 5/1993 | Uchida | 395/705 |
| 5,228,039 | 7/1993 | Knoke et al. | 395/183.04 |
| 5,243,603 | 9/1993 | Broeren | 371/27.1 |
| 5,255,385 | 10/1993 | Kikuchi | 395/183.01 |
| 5,265,254 | 11/1993 | Blasciak et al. | 395/704 |
| 5,297,285 | 3/1994 | Abrahamsson et al. | 395/685 |
| 5,347,649 | 9/1994 | Alderson | 395/680 |
| 5,367,685 | 11/1994 | Gosling | 395/707 |
| 5,371,689 | 12/1994 | Tatsuma | 364/569 |
| 5,371,747 | 12/1994 | Brooks et al. | 395/183.14 |
| 5,394,544 | 2/1995 | Motoyama et al. | 395/183.07 |
| 5,404,496 | 4/1995 | Burroughs et al. | 395/183.04 |
| 5,410,703 | 4/1995 | Nilsson et al. | 395/712 |
| 5,469,574 | 11/1995 | Chang et al. | 395/705 |
| 5,594,904 | 1/1997 | Linnermarch et al. | 395/183.21 |
| 5,630,049 | 5/1997 | Cardoza et al. | 395/183.01 |
| 5,668,999 | 9/1997 | Gosling | 395/704 |

FOREIGN PATENT DOCUMENTS 0 595 540 A1  5/1994  European Pat. Off. .

OTHER PUBLICATIONS

*IBM Technical Disclosure Bulletin* vol. 36, No. 09B, Sep. 1993 Application of Interpreter for Debugging Functions pp. 67–68, XP000397074.

*Primary Examiner*—Hal D. Wachsman
*Attorney, Agent, or Firm*—Jenkens & Gilchrist, P.C.

[57] ABSTRACT

A method, and associated circuitry, for testing operation of computer software of a computer system, such as a telephonic switch system. The computer system may be installed and optionally on-line while the computer software is being tested. Multiple portions of the computer software are executed while the computer software is under test. Selected portions of the computer software are tested in interpreted form. Remaining portions are executed more quickly in compiled form. Therefore, line-by-line execution of only portions of the computer software is required during testing of the entire computer software. The selected portions may be selected, for example, either manually during run-time or automatically based on commands within the code of the computer software. In another embodiment of the invention, the line-by-line interpreted testing of portions of the computer software is conducted with a computerized emulator.

27 Claims, 4 Drawing Sheets

METHOD AND SYSTEM FOR TESTING COMPUTER SYSTEM SOFTWARE

The present invention relates generally to systems and methods for testing, or otherwise debugging, computer software of a message-oriented computer system. More particularly, the present invention relates to a method and associated computer system circuitry which tests operation of computer software of the computer system.

Operation of the computer software can be tested while the computer system, such as a telephonic switch system, is operated on-line, thereby to permit testing of the computer system after its installation at a work-site. The computer system need not be removed from service while the testing operations are performed.

BACKGROUND OF THE INVENTION

Advancements in digital technologies have permitted the widespread usage of processor-based products and services. Products and services heretofore unavailable have been made possible through the use of such digital technologies. And, many existing products and services have been made more efficient and affordable as a result of such digital technologies.

With the increasing affordability of increasingly-complex, processor-based circuitry, ever-more complex circuitry shall likely be increasingly used in additional systems and services.

The processor-based circuitry includes software which is executed during operation of the processor-based circuitry. With advancements in the hardware components of the processor-based circuitry, increasingly-complex software can be speedily executed to permit increasingly complex tasks to be performed by the processor-based circuitry.

When developing the software to be executed during operation of the processor-based circuitry, subsequent to creation of the software program and the coding thereof, the software must be tested to ensure that, when executed, the software is operable in manners in which it was intended.

Frequently, during testing of the computer software, unanticipated problems or "bugs" are sometimes discovered. Once discovered, appropriate alteration of the software program is necessitated to correct, or "debug" the software. Subsequent testing of the software is typically also necessitated to ensure that the program alterations made during debugging operations do not introduce additional bugs into the software.

During developmental testing, the software program is typically executed line-by-line in interpreted form. Trace programs or commands are sometimes inserted between lines of the interpreted code of the computer software undergoing testing. Such tracing provides the tester with indications of program execution at any point in the program. As the steps of the program formed of the computer software are iteratively performed, a tracing step can be inserted as an additional line to be executed at any location. While time-consuming, such testing provides an indication of the location in the code of the computer software at which point the software becomes operative in manners other than intended.

While developmental testing of the computer software is usually effective in detecting software bugs, sometimes the software bugs remain unnoticed and, hence, uncorrected. Sometimes, the presence of a software bug becomes evident only after the processor-based circuitry is placed into service. Debugging of the computer software is necessitated to determine the location of the bug. As noted above, conventional debugging operations require that the computer software be executed by the processor of the processor-based circuitry in interpreted form. Line-by-line execution of interpreted code is therefore required.

Because such program execution is time-consuming, the processor-based circuitry must typically be taken out of service and placed off-line in order to perform the testing operations upon the computer software. Such requirement to place the circuitry off-line requires the substitution of working circuitry in its place or necessitates the interruption of usage of the circuitry.

A telecommunications switching system is exemplary of processor-based circuitry having computer software executable by a processor during operation of the switching system. Analogous to the development and testing procedures discussed above, once the software for the telecommunications switching system has been developed, testing of the software is performed to ensure that the switching system operates properly once installed in a telecommunications network. Again, however, in some instances, initial testing does not detect the software bugs. Such software bugs may become evident only after installation of the telecommunications switching system in a telephonic network. If a software bug thereafter becomes evident, testing operations are required to be performed to correct the software bug. As existing software testing methods and systems require that the entire software code be executed in interpreted form in a line-by-line manner, testing operations require significant amounts of time to be performed.

Emulators which emulate operation of a telecommunications switching system are sometimes utilized in the design of the switching systems. The emulators are sometimes used, in this regard, also to test the software during the development of the switching system. Such emulators emulate operation of an actual switching system. When testing the operation of the software of a switching system at such an emulator, the software must again, in the existing art, be executed in interpreted form in a line-by-line manner. Such a requirement is again time-consuming.

A manner by which the computer software of a computer system, such as a telecommunications switching system, may be more expeditiously tested would therefore be advantageous.

It is in light of this background information related to the testing of computer software of a computer system, such as a telecommunications switching system, that the significant improvements of the present invention have evolved.

SUMMARY OF THE INVENTION

The present invention advantageously provides a manner by which to test the computer software of a computer system. Only selected portions of the software need to be executed in interpreted form; other portions of the computer software are executed in compiled form. As program execution of the software in compiled form is effectuated much more quickly than line-to-line execution of the software in interpreted form, appropriate selection of execution of only minimal portions of the software in interpreted form permits testing of the software to be performed expeditiously.

Testing operations can be performed upon computer software of a computer system even after the computer system is installed at a work-site and is placed into service thereat. Because only selected portions of the computer software are executed in interpreted form, permitting remaining portions of the computer software to be executed in compiled form, only minimal time delays are incurred when testing selected portions of the software in interpreted form. In some instances, the computer system need not be taken off-line to perform the testing operations. By permitting the computer system to remain on-line, the need otherwise to interrupt the operation of the computer system to replace the computer system with a substitute system is obviated.

A computer system emulator may also advantageously embody the teachings of the present invention. Testing of the software of the computer system emulator again need not be performed entirely in interpreted form. Only the portions of the computer software which are to be tested are executed in interpreted form; other portions of the software of the emulator are executed in compiled form. Because line-by-line execution of the computer system emulator software is not required, significant time delays which would otherwise be required to execute the software in interpreted form is obviated.

The computer system, for instance, may be formed of a telecommunications switching system. The teachings of the present invention may be utilized during design and construction of the switching system to test for the operability of the system and to debug the switching system software. And, after installation of the telecommunications switching system at a working site and placement of the switching system into service, subsequent testing and debugging of later-detected program bugs may be performed. Because only the selected portions of the software of the switching system undergoing testing are executed in interpreted form through operation of an embodiment of the present invention, testing operations may be performed while the switching system remains on-line.

Analogously, the computer system emulator may, for instance, be formed of a telecommunications switching system emulator. Software development of the software for a telecommunications switching system may be developed and debugged by way of the emulator utilizing an embodiment of the present invention. Only selected portions of the software are executed in interpreted form; remaining portions of the software are executed in compiled form. Program debugging can be performed expeditiously, with minimal delay.

In these and other aspects, a software-testing method, and associated circuitry, tests the computer software of a message-oriented computer system having at least one program module. The computer software of the computer system is executable in compiled form as compiled code and is executable in interpreted form as interpreted code. At least a selected portion of the computer software is selected to be tested. Generation of selected messages during operation of the computer system is detected. And, operation of the at least selected portions of the computer software is tested responsive to the generation of the selected messages.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
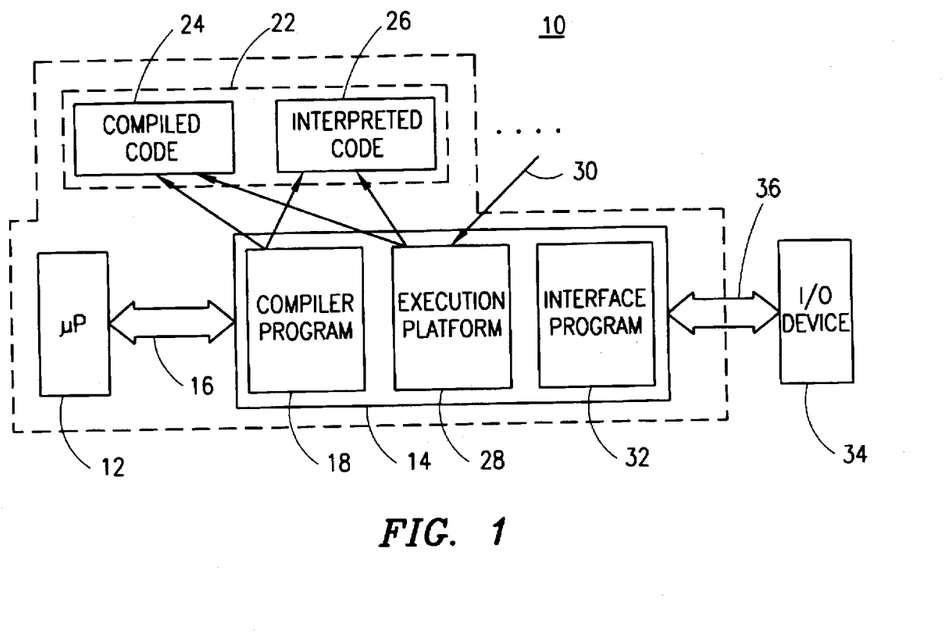
FIG. 1 is a functional block diagram of a computer system, exemplary of a computer system having software which can be tested during operation of an embodiment of the present invention.

Referring first to FIG. 1, a computer system, shown generally at 10, executes, during its operation, software programs. The computer system 10 is exemplary of many different types of computer-based devices including, for example, a telecommunications switch. The computer system 10 is also exemplary of an emulator which emulates operation of a computer-based device, such as a telecommunications switch emulator. A software-testing method, and associated circuitry for effectuating the testing of the software in an expeditious manner, are embodied in the computer system 10.

Such expeditious testing of software executable by the computer system 10 can be performed during development of the software to test the performance of the software and to perform debugging of the software if bugs or other software malfunctions are observed. The software can further be tested after the computer system in which the software is installed is placed on-line as a working device.

In contrast to conventional software-testing methods, the software-testing method of an embodiment of the present invention does not require execution of the entire software program undergoing testing line-by-line, in interpreted form. Instead, only selected portions of the software program are executed in interpreted form.

Other portions of the software program are executed in compiled form. Thereby, testing of the software utilizing the teachings of an embodiment of the present invention can be much more quickly performed. The speed at which the software testing can be performed is particularly significant when the testing is to be performed upon a computer-based device already installed as an on-line device. Because of the speed at which the testing can be performed, the software of the computer-based device undergoing testing can be performed on-line without requiring the device to be taken off-line and out of service in order for the software to be tested.

The computer system 10 includes a processing device 12, conventional in nature, and operable, inter alia, to retrieve and to execute software programs stored in a memory device, such as the resident memory device 14.

A bus 16 connects the processing device 12 with the memory device 14, again in conventional manner. While not illustrated, the bus 16 can similarly connect the processing device 12 with other memory devices and other circuitry of the computer system.

To execute the software program stored in the memory device 14, as well as other memory devices, the software programs must first be converted into forms which permit their execution by the processing device.

A conventional compiler program 18 is stored in the resident memory device 14 or is otherwise accessible by the processing device 12. The compiler program 18 is operative to convert a software program, such as that represented by the program module 22, into compiled code, here compiled code 24, which can be executed by the processing device 12 to perform the task defined by the software program of the program module 22.

The compiler program 18 is further operable to convert the software program of the program module 22 into interpreted form as interpreted code 26. The interpreted code 26 is also executable by the processing device 12 to perform the task defined by the software of the program module 22.

While not separately shown, the computer system 10 typically includes a plurality of program modules 22 representative of a plurality of software programs which can be accessed and executed by the processing device 12 during operation of the computer system. The software programs of such other program modules can analogously be converted by the compiler program 18 into compiled form as compiled code and into interpreted form as interpreted code.

An execution platform 28, here also shown to be resident in the resident memory device 14, retrieves the codes into which the software programs of the program modules, such as program module 22, are converted to permit their execution during operation of the computer system 10. Typically, the compiled codes, such as the compiled code 24, of the program modules are retrieved and executed as the compiled code can typically most quickly be executed to perform the operation defined by the software program represented by the relevant program module.

Because storage of compiled code sometimes requires significant amounts of storage capacity, the software programs of rarely-used program modules are sometimes not converted into compiled form, and such software programs are instead executed in interpreted form. The execution platform effectuates, during its execution by the processing device 12, retrieval of the appropriate code of an appropriate program module so that the retrieved code can be executed by the processing device 12, such retrieval being represented in the figure by the lines extending between the platform 28 and the program module 22.

Line 30 extending to the execution platform is representative of signals generated during execution of other program modules. Selected ones of such signals when generated and detected can be selected to be "triggers" to initiate software testing operations. That is to say, responsive to detection of the generation of such signals, testing is commenced to observe execution of a program module responsive to receipt of such signals.

An interface program 32 is also shown to be resident in the resident memory device 14. The interface program 32 is also accessible by the processing device 12. When executed, the interface program forms an interface with an input and output device 34 by way of lines 36. The input and output device 34 may be comprised of, for example, an input keyboard and a display terminal. As mentioned previously, conventional debugging operations require that the software undergoing debugging be executed entirely in interpreted form as interpreted code. Such a requirement typically requires significant amounts of time to perform the debugging operations. And, when a software malfunction is not detected in a computer system until after the computer system is placed on-line, the typically significant amount of time required to execute the program module in interpreted form typically requires the computer system to be taken off-line, resulting either in interruption in service for users of the computer system or substitution of the computer system with an alternate system, a sometimes expensive alternative.

The circuitry and method of an embodiment of the present invention permits testing of software programs to be effectuated more quickly than conventionally required as the software undergoing testing need not be entirely executed line-by-line in interpreted form.

Instead, the software program undergoing testing is executed in compiled form until the particular portion of the program to be tested is reached. Then, only the portion of the program undergoing testing is executed in interpreted form. By properly detecting the times in which execution of the software program in compiled form has reached the portion of the software program which is to undergo testing, the program can then continue to be executed in interpreted form. As execution continues thereafter line-by-line, performance of the software can be closely monitored.

For example, traces can be inserted into the interpreted code where desired to test operation of the software program as the program is executed. The traces can be inserted into lines of interpreted code preceding the lines of interpreted code which are to be tested or upon lines, or inserted as new lines, into the interpreted code subsequent to detection of the portion of the software program upon which debugging or other testing operations are to be performed.

An operator of the computer system 10 is supplied with data pertaining to the execution state of the software program by appropriate display upon the output device portion of the input and output device 34. The operator can also enter the program traces by way of the input portion of the device 34 as well as initiate testing operations of a software program and selected portions thereof. By executing the selected portions of the software program in interpreted form, line-by-line execution of the selected portion is effectuated, and the operator of the computer system 10 is able to monitor the program execution. Thereby, the software program can be tested and debugged, if necessary.

Figure 2:
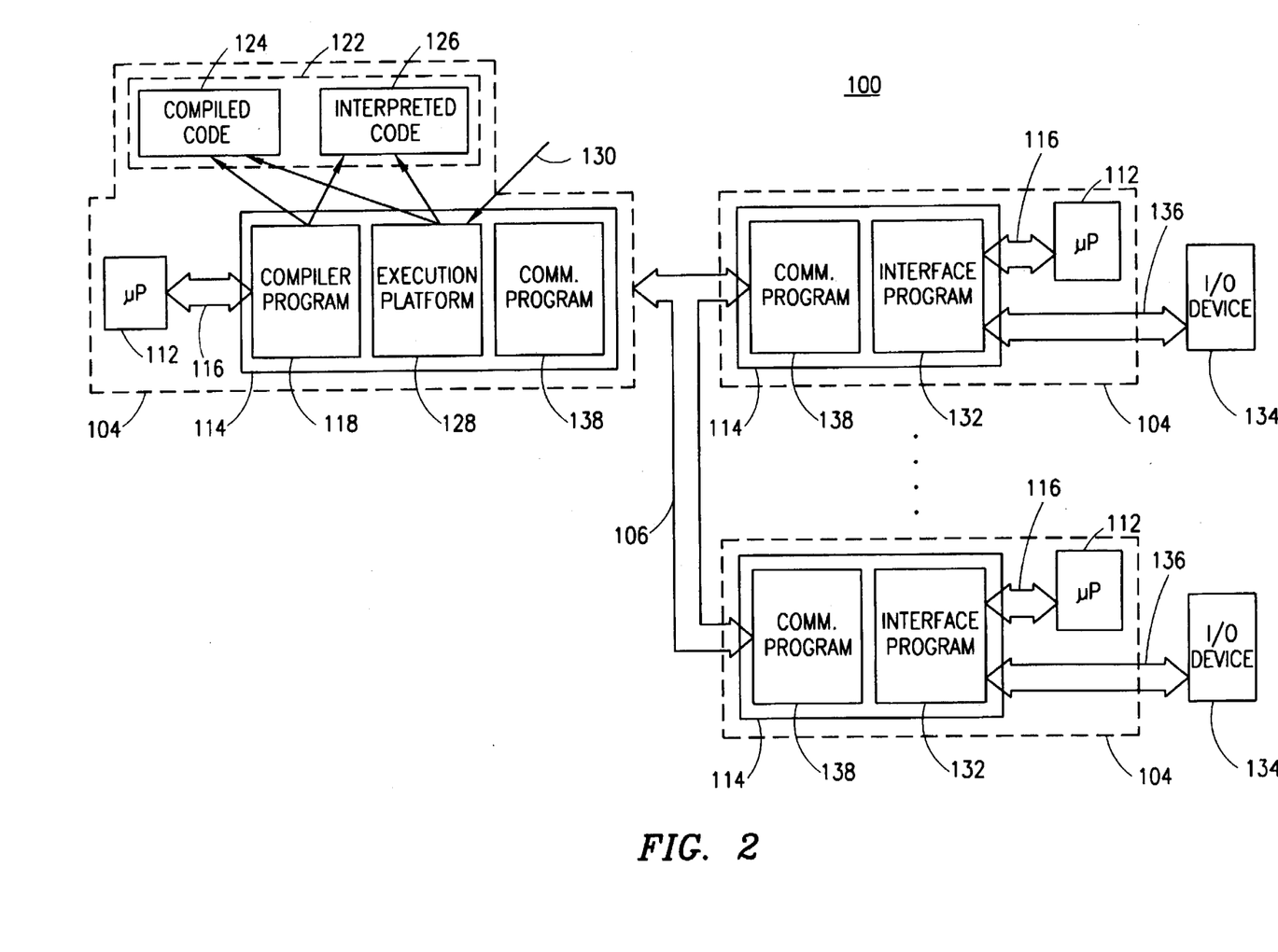
FIG. 2 is a functional block diagram, similar to that of FIG. 1, but of another computer system, also exemplary of a computer system having software which can be tested during operation of an embodiment of the present invention.

FIG. 2 illustrates a computer system, shown generally at 100, formed of a plurality of computing stations 104 which are connected together by way of a network connection, here indicated by a bus 106. For purposes of simplicity, the bus 106 is shown functionally; it should be noted, however, that the network connection between computing stations is typically a token-ring, or other serial, type of network connection.

Because of the networked connection between the computer stations 104, an operator positioned at any one of the computing stations 104 can initiate effectuation of software testing operations of software of any of the computing stations 104 by way of the network bus 106.

The computing stations 104 each include a processing device 112, each coupled to a resident memory device 114 by way of internal buses 116.

For purposes of illustration, the left-most (as shown) computing station 104 includes a compiler program 118 resident in the resident memory device 114. Again, the compiler program is operative, when executed, to convert a software program contained in a program module 122 into compiled code 124 and interpreted code 126.

While not separately shown, others of the computing stations 104 similarly can include compiler programs for converting the software programs of program modules into compiled and interpreted codes.

The left-most (as shown) computing station 104 further includes an execution platform 128, operative upon execution by the processing device 112 to effectuate execution of selected program modules, such as the program module 122. The execution platform 128 is operable in a manner analogous to operation of the execution platform 28 described previously with respect to FIG. 1. While again not separately shown, others of the computing stations 104 can include similar such execution platforms, operable in similar manners. A line 130 extending to the execution platform 128 is also illustrated in the figure. The line is representative of signals generated during execution of other program modules and is analogous to the line 30 shown previously with respect to FIG. 1.

The right-most (as shown) computing stations 104 are shown to include interface programs 132 which, when executed, interface with input and output devices 134 by way of lines 136. While again not separately shown, the left-most (as shown) computing station 104 can also include an interface program operable in conjunction with an input and output device.

Each of the computing stations 104 connected together by the network bus 106 includes a communication program 138 resident in the resident memory devices 114 of the respective computing stations. The communication programs 138, conventional in nature, are operable, when executed, to permit the networked communication between the various computing stations 104.

Through such networked connections between the computing stations 104, an operator positioned at any of the computing stations 104 can initiate effectuation of testing or debugging operations to be performed upon software resident, or otherwise located, at another of the computing stations 104. For instance, an operator positioned at one of the right-most (as shown) computing stations 104 can initiate testing operations to be performed upon a software program represented by the program module 122 of the left-most (as shown) computing station. Compiled code is executed during execution of the execution platform 128 until the selected portion of the software program is detected. Thereafter, the software program is executed in interpreted form by execution of the interpreted code 126. Traces can be inserted into the interpreted code, as desired, upon input by an operator positioned at another computing station.

Testing of any of many various types of computer systems can be more quickly effectuated through operation of an embodiment of the present invention. In one embodiment, the computer system forms a telecommunications switch. In an other embodiment, the computer system forms an emulator which emulates a telecommunications switch. The computer system may, of course, alternately form another computer-based device or emulator thereof.

Figure 3A:
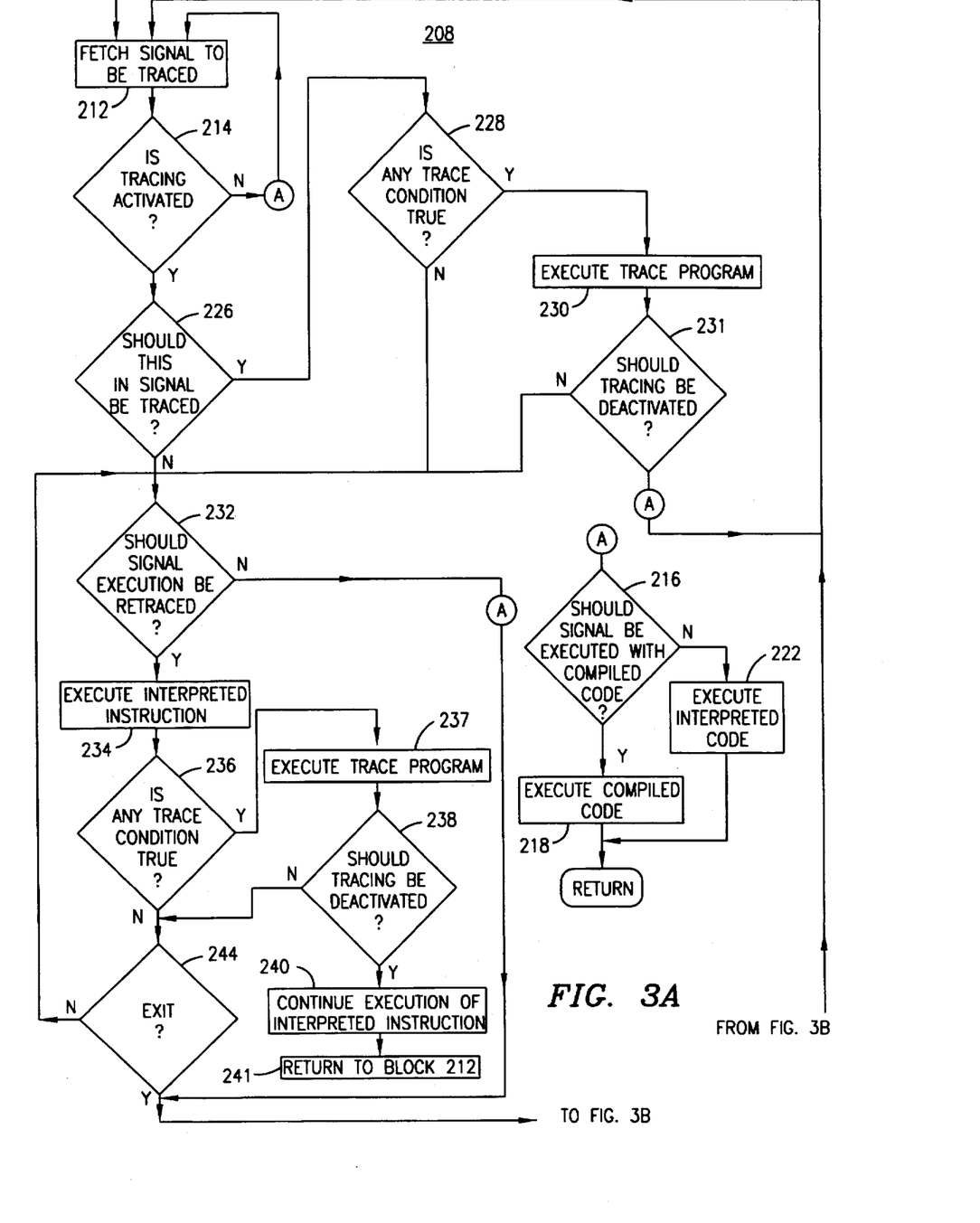
FIG. 3A and 3B illustrate a flow diagram listing the method of operation of an embodiment of the present invention.
Figure 3B:
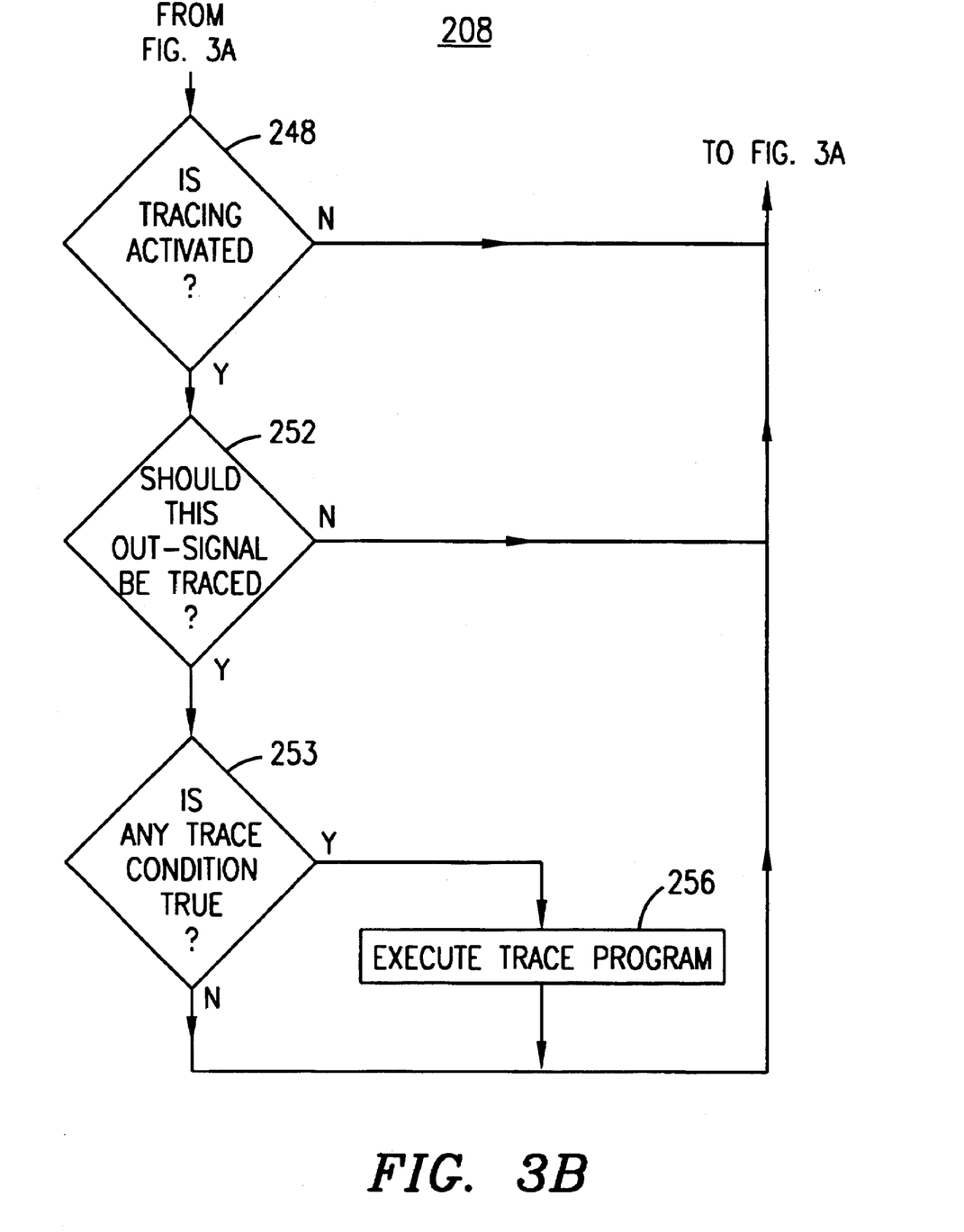

FIG. 3A and FIG. 3B illustrate a method, shown generally at 208, of an embodiment of the present invention for testing software of a computer system. The software testing method 208 permits testing and debugging operations to be performed upon software of a computer system more quickly than required utilizing conventional software testing techniques. The software-testing method 208 may be utilized to test and debug software of a computer system during development of the computer system as well as once the computer system has been installed as an operating device. Because the software can be tested and debugged more quickly than pursuant to conventional testing methods, the computer system need not necessarily be taken off-line to perform the testing operations thereupon.

First, and as indicated by the block 212, a signal to be executed is retrieved. Then, and as indicated by the decision block 214, a determination is made as to whether tracing, i.e., testing is activated. Tracing is activated, for example, by command, and is thereafter deactivated, also by command, or by execution of a particular trace program. Trace conditions in trace programs are also generated by command. If tracing has not been activated, the no branch is taken and a subroutine A is executed.

During execution of subroutine A a determination is first made as indicated by the block 216, as to whether the signal should be executed with compiled code. If the signal should be executed with compiled code, the yes branch is taken, and the compiled code is executed, as indicated by the block 218. If, conversely, the signal should not be created with compiled code, the no branch is taken, and interpreted code is instead executed, as indicated by the block 222. In conventional fashion, after completion of the subroutine, execution of the main program continues. When the subroutine is executed after taking the no branch from decision block 214, continued execution of the program at block 212 occurs.

If a determination is made at the decision block 214 that tracing is activated, the yes branch is taken to decision block 226 whereat a determination is made as to whether an IN-signal (i.e., input signal) should be traced. If a decision is made that the IN-signal should be traced, the Yes branch is taken to decision block 228 whereat a determination is made as to whether a trace condition is true. If so, the yes branch is taken, and the trace-program connected to the trace condition is executed, as indicated by the block 230.

Then a determination is made at the decision block 231 as to whether tracing should be deactivated. As noted previously, tracing is deactivated by an appropriate command to deactivate tracing or as a result of execution of the trace program, and the determination made at the decision block 231 determines whether such a command has been entered whether the tracing has been executed. If tracing should be deactivated, the yes branch is taken to subroutine A, described above.

If a negative determination is made at any of the decision blocks 226, 228, or 231 the respective no branch is taken to decision block 232 whereat the determination is made as to whether signal execution should be traced.

If signal execution should be traced, the yes branch is taken to block 234 and the interpreted instruction is executed. Otherwise, the no branch is taken to subroutine A and the subroutine A, described above, is executed.

Once the interpreted instruction is executed at the block 232, a determination is made as to whether any trace condition is true, as indicated by the decision block 236. If so, the yes branch is taken, and the trace-program connected to the trace condition is executed, as indicated by the block 237. Thereafter, a determination is made at decision block 238 as to whether tracing should be deactivated in a manner analogous to the determination made at decision block 231. If tracing should be deactivated, the yes branch is taken to block 240, and execution of the interpreted instruction continues. Thereafter, a return is made, as indicated by block 241, to block 212 to continue execution of the program, if appropriate.

If a no branch is taken from either block 236 or 238, a determination is made as indicated by the decision block 244, as to whether an exit should be made from the tracing operations.

If a decision is made not to exit, the no branch is taken back to decision block 232. If, conversely, a decision is made to exit at the decision block 244, the yes branch is taken to the decision block 248 whereat a determination is made as to whether tracing is activated. If not, the no branch is taken back to block 212. Otherwise, the yes branch is taken to the decision block 252, and a determination is made as to whether the OUT-signal (i.e., output signal) should be traced. If not, the no branch is taken back to block 212; otherwise, the yes branch is taken to block 253 whereat a determination is made as to whether a trace condition is true. If so, the yes branch is taken to block 256 whereat a trace program is executed.

Testing of the software of a computer system is thereby possible even after the computer system is installed at a work-site and is placed into service. Because only selected portions of the computer software are executed in interpreted form, remaining portions of the computer software are executed in compiled form, only minimal time delays are incurred when testing selected portions of the software in interpreted form. On-line testing of the computer software is thereby possible. A computer system emulator also advantageously embodies the teachings of the present invention to permit the speedy testing of computer software.

Only portions of the software undergoing testing are executed in interpreted form, other portions of the software are executed in compiled form. Significant amounts of processing time otherwise required to test the software are avoided.

The previous descriptions are of preferred examples for implementing the invention, and the scope of the invention should not necessarily be limited by this description. The scope of the present invention is defined by the following claims.

What is claimed is:

1. A method for accelerating software testing for a message-oriented computer system having at least one program module, the computer system having computer software executable in compiled form as compiled code and executable in interpreted form as interpreted code, the computer software having a plurality of portions, said method comprising the steps of:

executing multiple portions of the plurality of portions of the computer software;

determining whether a selected portion of the computer software is to be tested;

if so, executing the selected portion of the computer software in the interpreted form as interpreted code; and if not, executing the selected portion of the computer software in the compiled form as compiled code.

2. The method of claim 1 wherein the computer system includes an input device for inputting at least one command to test the selected portion of the computer software and wherein said step of determining comprises receiving and decoding the at least one command inputted by way of the input device.

3. The method of claim 1 wherein the interpreted code is formed of a plurality of instruction steps and wherein said step of executing the selected portion in the interpreted form further comprises the steps of:

determining whether a value of a trace condition formed during execution of at least selected ones of the plurality of instruction steps of the interpreted code is a selected amount; and executing a trace program associated with the trace condition when the value of the trace condition is of the selected amount.

4. The method of claim 1 comprising the further steps of; inputting an input signal to the computer system and executing a trace program associated with the input signal.

5. The method of claim 4 wherein the input signal is input during said step of inputting prior to said step of determining.

6. The method of claim 5 wherein the computer system includes a kernel element and a processor, the kernel element being executable by the processor, and wherein the input signal input during said step of inputting is applied to the kernel element during execution of the kernel element.

7. The method of claim 1 wherein the computer system comprises a user interface device and an interface program operable responsive thereto and wherein the input signal input during said step of inputting is input through the user interface device.

8. The method of claim 7 wherein the computer system comprises a first computer device and a second computer device, the first computer device and the second computer device connected together by a network connection, wherein the input signal input during said step of inputting is input through the second computer device, and wherein the selected portion of the computer software executed during at least one of said steps of executing is executed at the first computer device.

9. The method of claim 1 comprising the further steps of: generating an output signal responsive to execution of the selected portion of the computer software during either of said steps of executing; and executing a trace program associated with the output signal.

10. The method of claim 1 wherein the computer system comprises a compiler program and wherein said method comprises the introductory steps of creating the compiled code and creating the interpreted code by executing the compiler program.

11. The method of claim 1 wherein the computer system comprises a telecommunications switching system, wherein the computer software comprises a program module forming a portion of the telecommunications switching system, and wherein the selected portion of the computer software executed during at least one of said steps of executing comprises selected segments of the program module.

12. The method of claim 1 wherein the computer system comprises a telecommunications switching system emulator, wherein the computer software comprises a program module forming a portion of the telecommunications switching system emulator, and wherein said steps of executing comprise executing selected segments of the program module.

13. The method of claim 1 comprising the further step of determining whether the compiled code is available to be executed and wherein said step of executing the selected portion of the computer software in the compiled form as compiled code is performed only when the compiled code is determined to be available during said step of determining whether the compiled code is available.

14. The method of claim 13 further comprising the additional step, subsequent to said step of determining whether the compiled code is available, of selecting whether to execute the computer software in the compiled form as compiled code.

15. In a testing method for accelerating a testing operation of a telecommunications switch having a processing unit for executing at least one program module, an improvement of a method for on-line testing of operation of the at least one program module, the at least one program module executable in interpreted form as interpreted code and executable in compiled form as compiled code, the at least one program module including a plurality of portions, said method comprising the steps of:

executing multiple portions of the plurality of portions of the at least one program module;

determining whether a selected portion of the at least one program module is to be tested;

if so, executing the selected portion of the at least one program module in the interpreted form as interpreted code; and if not, executing the selected portion of the at least one program module in the compiled form as compiled code.

16. Testing circuitry for accelerating a testing operation of a computer system having a processor for executing computer software, the computer software executable in interpreted form as interpreted code and executable in compiled form as compiled code, said testing circuitry comprising:
- a determiner for determining whether a selected portion of the computer software is to be tested;
- a first program executor operative responsive to said determiner, said first program executor for executing the selected portion of the computer software in the interpreted form as interpreted code if said determiner determines that the selected portion of the computer software is to be tested; and
- a second program executor operative responsive to said determiner, said second program executor for executing the selected portion of the computer software in the compiled form as compiled code if said determiner determines that the selected portion of the computer software is not to be tested.

17. The testing circuitry of claim 16 wherein said determiner is responsive to a user interface device and an interface program, which is operable responsive to said user interface device.

18. The testing circuitry of claim 17 wherein said user interface device further permits display of output signals generated during execution of the selected portion of the computer software.

19. The testing circuitry of claim 18 wherein the computer system comprises a first computer device and a second computer device, the first computer device and the second computer device connected together by a network connection, and wherein said first program executor and said second program executor are positioned at the first computer device.

20. The testing circuitry of claim 19 wherein said user interface device is positioned at the second computer device.

21. In a software testing method for accelerating testing of computer software that is executable in compiled form as compiled code and executable in interpreted form as interpreted code, an improvement of a method for dynamically controlling execution of the computer software during the testing thereof, said method comprising the steps of:
- executing a plurality of portions of the computer software;
- executing individual ones of the plurality of portions of the computer software alternately in the interpreted form and in the compiled form;
- determining whether a particular portion of the plurality of portions of the computer software is to be executed in the interpreted form or in the compiled form;
- executing the interpreted code when the particular portion is determined to be executed in interpreted form in said step of determining; and
- executing the compiled code when said particular portion is determined to be executed in compiled form in said step of determining.

22. A method for accelerating testing of a software program in which only selected portions are executed line-by-line, the software program having a plurality of portions and including compiled code and interpreted code, the method comprising the steps of:
- executing individual ones of the plurality of portions of the software program in compiled form using the compiled code as a default execution option;
- detecting a command to test a particular portion of the plurality of portions of the software program;
- selecting the particular portion for testing; and
- executing the particular portion of the software program in interpreted form using the interpreted code as a testing execution option.

23. The method of claim 22 wherein said step of detecting a command detects a command that is within the software program.

24. The method of claim 22 wherein said step of detecting a command detects a command that is input by an operator at an input terminal.

25. The method of claim 22 wherein said step of detecting a command detects a command that is received from another software program.

26. The method of claim 22 comprising the further step of executing a trace program as part of the testing.

27. The method of claim 22 comprising the further step of, after said step of executing the particular portion of the software program in interpreted form using the interpreted code as a testing execution option, continuing the execution of individual ones of the plurality of portions of the software program in compiled form using the compiled code as the default execution option.

* * * * *